W. V. TURNER.
SAFETY VALVE.
APPLICATION FILED SEPT. 19, 1905.

935,709.

Patented Oct. 5, 1909.

WITNESSES
J. S. Custer
Fred Leary

INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

SAFETY-VALVE.

935,709.                 Specification of Letters Patent.          Patented Oct. 5, 1909.

Application filed September 19, 1905. Serial No. 279,156.

*To all whom it may concern:*

Be it known that I, WALTER V. TURNER, a citizen of the United States, residing in Wilkinsburg, in the county of Allegheny and State of Pennsylvania, have invented a certain new and useful Improvement in Safety-Valves, of which the following is a specification.

This invention relates to safety valves, and more particularly to that class known as pop safety valves, in which the opening and closing of the valve occurs in a prompt and positive manner.

The main object of my invention is to provide an improved safety valve of this type, in which the valve will instantly move to a wide open position as soon as it begins to open under the pressure of the air, steam or other fluid, and when the pressure is diminished a certain amount, will then move quickly and positively to its seat by means of an opposing fluid pressure acting in conjunction with the spring.

Another feature of my invention relates to means for readily adjusting the range or amount of fall in pressure between the opening and closing points of the valve.

Figure 1:
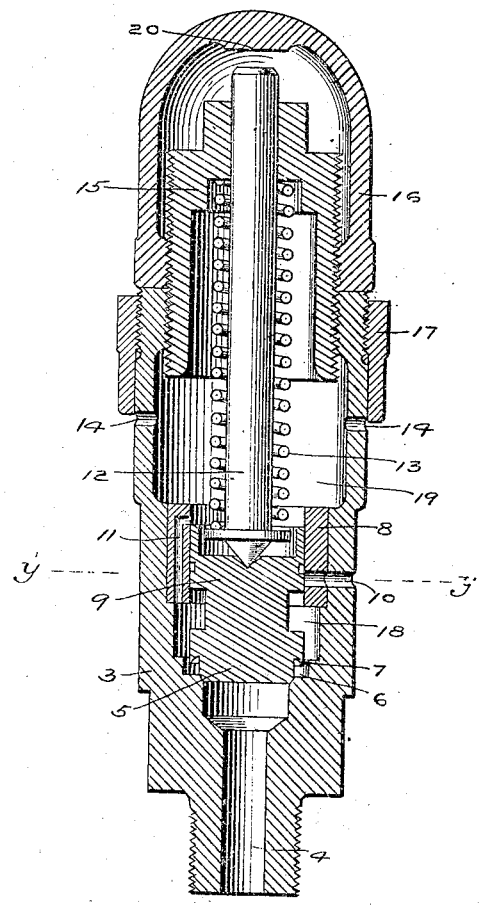
Figure 2:
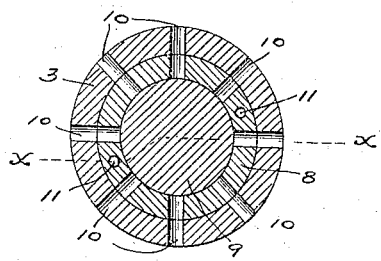

In the accompanying drawing, Figure 1 is a vertical section of a safety valve device embodying my improvements, and taken on the line $x$—$x$ of Fig. 2, and Fig. 2 is a horizontal section taken on the line $y$—$y$ of Fig. 1.

According to the construction shown the safety valve device comprises a body portion 3, containing a valve chamber 18, spring chamber 19, and a passage 4 leading from the valve seat and adapted to communicate with a boiler, reservoir, cylinder or other receptacle containing steam, air, or other fluid under pressure.

A small huddling chamber 6 may be formed just above the valve seat and the valve 5 may be provided with an annular lip portion 7 for receiving the impact from the flow of fluid as the valve begins to open to assist in causing the valve to immediately rise to a wide open position. Above the valve is mounted a spring 13, with stem 12, adjustable nut 15 and cap nut 16.

According to my invention, a movable abutment or piston, subject to fluid pressure, is employed for assisting the closing movement of the valve, and for this purpose I prefer the construction shown in the drawing, in which the piston 9 is connected directly to the valve 5 and operates in a bushing 8 above the valve chamber. According to this arrangement the spring chamber 19 also becomes a pressure chamber and is adapted to receive fluid under pressure from the valve chamber through one or more ports 11 formed in the bushing 8. These ports 11 are controlled by the movement of the piston, as are also the outlet ports 10, of which there may be any desired number, the location being such that when the valve is closed, as indicated in the drawing, the outlet ports 10 are also closed while the pressure ports 11 are open, and when the piston rises to open the outlet ports 10, it also closes the ports 11.

One or more small vent ports 14 are provided for the pressure chamber 19, and the capacity of these vent ports bears a certain relation to the capacity of the pressure supply ports 11 to give the desired action of the valve in closing. This relation may be varied to suit different conditions by means of the adjustable nut or ring 17 which may be turned to regulate the capacity of the vent ports 14 and thereby regulate the amount of fall in pressure between the opening and closing of the valve.

The operation is as follows:—The spring being adjusted to the pressure at which it is desired that the valve shall open, when this pressure accumulates on the face of the valve and raises it slightly from its seat, the fluid flows out in an annular jet and by the additional force of the impact or pressure then exerted upon the annular flange 7 immediately raises the valve and piston to open more or less widely the outlet ports 10 and close the pressure ports 11. This prevents, for the time being, the accumulation of pressure in chamber 19, while the pressure in the valve chamber exerted on under side of piston 9 also assists in this movement. As the pressure is then relieved by blowing off through the outlet ports 10 and diminishes to a point at which the spring 13 starts the valve and piston downward, the ports 11 begin to open and permit the passage of fluid to the chamber 19. The pressure then accumulates in chamber 19 on the upper face of the piston more or less rapidly, corresponding to the relative capacities of the ports 11 and 14, and acting in conjunction with the spring immediately carries the valve to its seat with a prompt and positive movement, thereby cutting off the discharge through the valve chamber and ports 10 and also the supply through ports 11 to the pressure chamber. The pressure in chamber 19 then immediately equalizes with the atmosphere through vent ports 14.

By adjusting the vent ports to a large area or capacity it will be seen that the rise in pressure in chamber 19 from the supply through ports 11 will be very slow, so that the closing movement of the valve will be delayed and a correspondingly larger drop in pressure in the receptacle will occur; while if the capacity of the vent port or ports is made very small the accumulation of pressure in chamber 19 will be so rapid as soon as the ports 11 begin to open as to instantly force the valve to its seat, thereby permitting only a slight fall in pressure. In this manner, the valve device may be readily adjusted to suit different conditions of service.

The extent to which the valve rises at any given time to open the outlet ports 10 depends, of course, upon the capacity of the valve, the volume of the receptacle and the rate at which the pressure is increasing therein, but when the valve moves to its extreme wide open position the stem 12 strikes the stop 20 on the cap nut and prevents further movement.

My improved safety valve device has the advantage of securing a prompt and positive closing of the valve upon any given degree of drop in pressure and maintains this degree constant throughout long periods of use. It is also adjustable to suit all kinds and conditions of service.

While my improvement is designed for general application as a safety valve and the invention is not limited to any particular use of the device, it may be mentioned that it is especially adapted for use in connection with compressed air reservoirs and brake cylinders of an air brake system.

Having now described my invention, what I claim as new and desire to secure by Letters Patent is:—

1. A safety valve device, comprising a valve, a spring tending to close said valve, a piston connected to the valve, means for supplying fluid under pressure to one side of said piston to effect a quick closing of the valve, and means for releasing said fluid when the valve is closed.

2. A safety valve device comprising a valve adapted to be opened by fluid pressure, an adjustable spring tending to close said valve, and a piston subject on one side to a variable fluid pressure for effecting a quick closing of the valve.

3. A safety valve device comprising a valve adapted to be opened by fluid pressure, a spring tending to close the valve, an outlet port, or ports, for the discharge of fluid under pressure, a piston subject on one side to the pressure in a chamber for tending to close said valve, and means controlled by the movement of the piston for varying the pressure in said chamber to effect a quick closing of the valve.

4. A safety valve device comprising a valve adapted to be opened by fluid pressure, a spring tending to hold said valve closed, an outlet port, or ports, for discharging fluid under pressure, a pressure chamber, a piston connected to the valve and subject to the pressure in said chamber, and a port controlled by the movement of the piston for supplying fluid under pressure to said chamber to effect a quick closing of the valve.

5. A safety valve device, comprising a valve, a spring tending to hold the valve closed, a piston connected to said valve and subject on one side to a variable fluid pressure, means for cutting off the supply of fluid pressure to the piston when the valve is closed, and an outlet port of ports controlled by said piston.

6. A safety valve device, comprising a valve, a spring tending to hold the valve closed, a pressure chamber, a piston connected to the valve and subject to the pressure in said chamber, an outlet port controlled by the piston, and a port also controlled by the piston for supplying fluid under pressure to said chamber.

7. A safety valve device, comprising a valve, a spring tending to hold the valve closed, an outlet port, or ports, for the discharge of fluid under pressure, a pressure chamber having a small vent port, a piston connected with said valve and subject to the pressure in said chamber, and a port controlled by the movement of the piston for supplying fluid to said chamber, to effect a quick closing of the valve.

8. A safety valve device, comprising a valve, a spring tending to close the valve, a pressure chamber having a vent port, means for adjusting the area or capacity of the vent port, a piston connected with said valve and subject to the pressure in said chamber, and means controlled by the movement of the piston for supplying fluid under pressure to said chamber.

9. A safety valve device, comprising a valve, a spring tending to close the valve, a valve chamber, a pressure chamber, a piston connected with said valve and subject to the pressure in the pressure chamber, an outlet port or ports from the valve chamber controlled by the movement of the piston, and a port from the valve chamber to the pressure chamber also controlled by the movement of the piston.

10. A safety valve device, comprising a valve, a spring tending to hold said valve closed, a piston connected to the valve, and means for supplying fluid under pressure to the one side of said piston to effect a quick closing of the valve, and outlet ports controlled by the piston, the width of the opening of the outlet ports being increased as the valve moves away from its seat.

11. A safety valve device, comprising a valve, a spring tending to hold said valve closed, a piston connected to the valve, and means operated by the closing movement of the valve for momentarily opening and then closing the supply of fluid to one side of said piston, to effect the closing movement of the valve.

12. A safety valve device, comprising a valve, a spring tending to hold said valve closed, a piston connected to the valve and subject to fluid pressure tending to hold said valve open, and means operating upon the preliminary closing movement of the valve for hastening said movement.

In testimony whereof I have hereunto set my hand.

WALTER V. TURNER.

Witnesses:
R. F. EMERY,
J. B. MACDONALD.